US008768067B2

(12) United States Patent
Abdo et al.

(10) Patent No.: US 8,768,067 B2
(45) Date of Patent: Jul. 1, 2014

(54) ACCELERATING BITMAP REMOTING BY IDENTIFYING AND EXTRACTING PATTERNS FROM SOURCE BITMAPS THROUGH PARALLEL PROCESSING TECHNIQUES

(75) Inventors: Nadim Y. Abdo, Redmond, WA (US); Voicu Anton Albu, Bellevue, WA (US); Charles Lawrence Zitnick, III, Seattle, WA (US); Max Alan McMullen, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 652 days.

(21) Appl. No.: 12/761,282

(22) Filed: Apr. 15, 2010

(65) Prior Publication Data

US 2011/0255791 A1    Oct. 20, 2011

(51) Int. Cl.
*G06K 9/48*   (2006.01)

(52) U.S. Cl.
USPC ........... 382/199; 382/162; 382/173; 382/243; 382/254; 358/1.9

(58) Field of Classification Search
USPC ............ 382/162, 173, 199, 243, 254; 358/1.9
See application file for complete search history.

(56) References Cited

U.S. PATENT DOCUMENTS

| 5,121,223 | A | * | 6/1992 | Roe | 358/3.07 |
| 5,848,185 | A | * | 12/1998 | Koga et al. | 382/173 |
| 6,154,754 | A | | 11/2000 | Hsu et al. | |
| 7,171,444 | B2 | | 1/2007 | Deshpande | |
| 7,480,406 | B2 | | 1/2009 | Aliffi et al. | |
| 7,724,934 | B2 | * | 5/2010 | Shinbata | 382/132 |

(Continued)

OTHER PUBLICATIONS

Yong, Z.., "WPF, Terminal Services & Bitmap Remoting," 2009, 2 pgs, downloaded Jan. 12, 2010, http://shevaspace.blogspot.com/2008/04/wpf-terminal-services-bitmap-remoting_05.html.

(Continued)

*Primary Examiner* — Chan Park
*Assistant Examiner* — Eueng-Nan Yeh
(74) *Attorney, Agent, or Firm* — Jim Sfekas; Kate Drakos; Micky Minhas

(57) ABSTRACT

Systems, methods and computer-readable storage media are disclosed for accelerating bitmap remoting by extracting patterns from source bitmaps. A server takes a source image, and performs an edge-detection operation on it. From this edge-detected image, connected segments of the image are determined by executing multiple iterations of a small operation upon the image in parallel—for instance, by assigning each non-white pixel a unique value, then assigning each pixel the minimum value among itself and its neighbors until no pixel is assigned a new value in an iteration. Executing these operations in parallel greatly reduces the time required to identify the connected segments. When the segments are identified, they may be cached by the client so that they do not need to be re-sent to the client when re-encountered by the server.

17 Claims, 15 Drawing Sheets

(56) References Cited

U.S. PATENT DOCUMENTS

| | | | |
|---|---|---|---|
| 2005/0197977 A1* | 9/2005 | Buck et al. | 706/12 |
| 2005/0270311 A1* | 12/2005 | Rasmussen et al. | 345/677 |
| 2006/0203007 A1 | 9/2006 | Bullard et al. | |
| 2007/0046980 A1 | 3/2007 | Coleman et al. | |
| 2008/0244458 A1 | 10/2008 | Brugiolo et al. | |
| 2008/0250424 A1 | 10/2008 | Brugiolo et al. | |
| 2008/0301566 A1 | 12/2008 | Abdo et al. | |
| 2008/0313549 A1 | 12/2008 | Stoyanov et al. | |
| 2009/0189894 A1 | 7/2009 | Petrov et al. | |
| 2010/0031009 A1* | 2/2010 | Muff et al. | 712/222 |
| 2010/0142813 A1* | 6/2010 | Abdo | 382/166 |
| 2010/0153692 A1* | 6/2010 | Kota et al. | 712/222 |

OTHER PUBLICATIONS

"Digital Image Processing, 3rd Edition," Jan. 4, 2010, 2 pgs, downloaded Jan. 12, 2010, http://www.imageprocessingplace.com/DIP-3E/dip3e_main_page.htm.

Gilbert, J., "Text / Graphics and Image Transmission over Bandlimited Lossy Links," Spring 2000, 276 pgs, downloaded Jan. 12, 2010, http://www1.cs.columbia.edu/~ricardo/misc/paper/T-G-I%20Transmission%20over%20lossy%20bandlimited%20links%20-%20Thesis.pdf.

* cited by examiner

FIG. 2

FIG. 3A

FIG. 3B 802 receiving a plurality of tile indications, each tile indication comprising an tile or a location in a cache of a tile, and a location to display each tile indication on a grid

804 receiving a feature indication, the feature indication comprising a feature or a location in the cache of a feature, and a location to display the feature

806 displaying an image, the image comprising each tile indication on the grid overlaid with the feature

FIG. 8

|   | 0 | 1 | 2 | 3 | 4 | 5 | 6 | 7 | 8 | 9 |
|---|---|---|---|---|---|---|---|---|---|---|
| 0 |   |   |   |   |   |   |   |   |   |   |
| 1 |   | 2 |   |   |   |   |   |   |   |   |
| 2 | 2 | 2 | 11|   |   | 43| 52|   |   |   |
| 3 |   | 2 |   |   | 43|   |   | 62|   |   |
| 4 |   | 13|   |   | 43| 43| 54| 64|   |   |
| 5 |   | 14|   |   | 44|   |   |   |   |   |
| 6 |   | 15|   |   |   | 45| 56|   |   |   |

FIG. 9C

|   | 0 | 1 | 2 | 3 | 4 | 5 | 6 | 7 | 8 | 9 |
|---|---|---|---|---|---|---|---|---|---|---|
| 0 |   |   |   |   |   |   |   |   |   |   |
| 1 |   | 2 |   |   |   |   |   |   |   |   |
| 2 | 2 | 2 | 2 |   |   | 43| 43|   |   |   |
| 3 |   | 2 |   |   | 43|   |   | 43|   |   |
| 4 |   | 2 |   |   | 43| 43| 43| 43|   |   |
| 5 |   | 12|   |   | 43|   |   |   |   |   |
| 6 |   | 13|   |   |   | 44| 45|   |   |   |

FIG. 9D

|   | 0 | 1 | 2 | 3 | 4 | 5 | 6 | 7 | 8 | 9 |
|---|---|---|---|---|---|---|---|---|---|---|
| 0 |   |   |   |   |   |   |   |   |   |   |
| 1 |   | 2 |   |   |   |   |   |   |   |   |
| 2 | 2 | 2 | 2 |   |   | 43 | 43 |   |   |   |
| 3 |   | 2 |   |   | 43 |   |   | 43 |   |   |
| 4 |   | 2 |   |   | 43 | 43 | 43 | 43 |   |   |
| 5 |   | 2 |   |   | 43 |   |   |   |   |   |
| 6 |   | 12 |   |   |   | 43 | 43 |   |   |   |

FIG. 9E

|   | 0 | 1 | 2 | 3 | 4 | 5 | 6 | 7 | 8 | 9 |
|---|---|---|---|---|---|---|---|---|---|---|
| 0 |   |   |   |   |   |   |   |   |   |   |
| 1 |   | 2 |   |   |   |   |   |   |   |   |
| 2 | 2 | 2 | 2 |   |   | 43 | 43 |   |   |   |
| 3 |   | 2 |   |   | 43 |   |   | 43 |   |   |
| 4 |   | 2 |   |   | 43 | 43 | 43 | 43 |   |   |
| 5 |   | 2 |   |   | 43 |   |   |   |   |   |
| 6 |   | 2 |   |   |   | 43 | 43 |   |   |   |

FIG. 9F

$$\begin{vmatrix} 1 & 0 & 1 \\ 1 & 1 & 1 \\ 1 & 0 & 1 \\ 0 & 0 & 0 \\ 0 & 1 & 1 \\ 1 & 1 & 0 \\ 1 & 0 & 0 \\ 1 & 0 & 1 \\ 1 & 1 & 1 \\ 0 & 0 & 0 \\ 1 & 1 & 0 \\ 1 & 1 & 1 \end{vmatrix}$$

FIG. 10A

$$\begin{vmatrix} 1 & 0 & X \\ 1 & A & X \\ 1 & 0 & X \\ 0 & 0 & 0 \\ 0 & B & Y \\ 2 & B & 0 \\ 2 & 0 & 0 \\ 2 & 0 & Z \\ 2 & C & Z \\ 0 & 0 & 0 \\ 3 & D & 0 \\ 3 & D & W \end{vmatrix}$$

FIG. 10B

$$\begin{vmatrix} 1 & 1 & 1 & 0 & 0 & 2 & 2 & 2 & 2 & 0 & 3 & 3 \\ 0 & A & 0 & 0 & B & B & 0 & 0 & C & 0 & D & D \\ X & X & X & 0 & Y & 0 & 0 & Z & Z & 0 & 0 & W \end{vmatrix}$$

FIG. 10C

$$\begin{vmatrix} 1 & 1 & 1 & 0 & 0 & 2 & 2 & 2 & 2 & 0 & 3 & 3 \\ 0 & 1 & 0 & 0 & B & 2 & 0 & 0 & 2 & 0 & 3 & 3 \\ X & 1 & X & 0 & B & 0 & 0 & Z & 2 & 0 & 0 & 3 \end{vmatrix}$$

FIG. 10D

ACCELERATING BITMAP REMOTING BY IDENTIFYING AND EXTRACTING PATTERNS FROM SOURCE BITMAPS THROUGH PARALLEL PROCESSING TECHNIQUES

BACKGROUND OF THE INVENTION

Although computers were once isolated and had minimal or little interaction with other computers, computers now interact with a wide variety of other computers through Local Area Networks (LANs), Wide Area Networks (WANs), dial-up connections, and the like. With the wide-spread growth of the INTERNET®, connectivity between computers has become more important and has opened up many new applications and technologies. The growth of large-scale networks, and the wide-spread availability of low-cost personal computers, has fundamentally changed the way that many people work, interact, communicate, and play.

One increasing popular form of networking may generally be referred to as remote presentation systems, which can use protocols such as Remote Desktop Protocol (RDP) and Independent Computing Architecture (ICA) to share a desktop and other applications executing on a server with a remote client. Such computing systems typically transmit the keyboard presses and mouse clicks or selections from the client to the server, relaying the screen updates back in the other direction over a network connection (e.g., the INTERNET®). As such, the user has the experience as if his or her machine is operating entirely locally, when in reality the client device is only sent screenshots of the desktop or applications as they appear on the server side.

Two common techniques to send graphics data to a client are (1) sending graphic primitives and other operations, which tell a sub-routine on the client side what and how to draw something, and (2) sending a bitmap image to the client for display. Often times, it requires less bandwidth to send a graphics primitive than the visual result of the execution of that graphics primitive. For instance, a text primitive for the 11-character string, "Hello world" could be expressed in 11 Unicode bytes. If each character is to be displayed in a 12-pixel-by-12-pixel area, then the bitmap representation of "Hello world" would require approximately 200-times more bytes to express, and therefore require approximately 200-times more bandwidth to send.

Likewise, the graphics primitive representation of both opaque rectangles, and scrolls of an image require at least an order of magnitude less bandwidth to transfer than their bitmap counterparts. A graphics primitive representation of an opaque rectangle typically requires no more than four bytes. The equivalent bitmap representation may be highly compressed, but will still generally require at least a few kilobytes. Likewise, an image scroll (sometimes referred to as a "screen-to-screen blit") may be expressed in a graphics primitive as a command that occupies approximately 10 bytes. The bitmap form of moving an 800-pixel-by-400-pixel window may require up to 1.83 MB (the 800-by-400 pixel area, multiplied by 3 bytes-per-pixel and doubled to account for both the old position and the new position), or approximately 10,000 times the space.

There are times when the graphics primitives are not available to send, such as when a previously stored image is to be sent. In such a case, where a bitmap frame is to be sent to a client (such as an application window), the bitmap frame may be subdivided into tiles. Those tiles are then cached on the client side, and when a tile is repeated between two bitmaps, rather than re-sending the client the tile, the server sends an instruction for the client to display the cached tile. This may greatly reduce the bandwidth costs of a remote presentation session, especially where tiles are frequently repeated.

However, even using these techniques for caching bitmap tiles, the bandwidth requirements of sending bitmaps still greatly exceeds that of sending graphics primitives. Further, there are many cases where caching proves to be ineffective, such as when a window is scrolled a number of pixels that is not an even multiple of the number of pixels in a dimension of a tile—even though the image is still substantially the same, because it does not align with the tiles in the same way, already cached tiles are unusable.

SUMMARY OF THE INVENTION

It would therefore be an improvement over the prior art to reduce the bandwidth required to send bitmap images across a remote presentation session. It would be a further improvement to provide parallel processing techniques with which to rapidly process images on the server side before sending them to the client. These parallel processing techniques may utilize a graphics processing unit (GPU) or vector processor.

In an embodiment of the present disclosure, a server computing device analyzes an image to be sent in a remote presentation session for possibly repetitive features (either repetitive within the image, or as among a plurality of images that the server will send in the session). These features may include things such as text, and an application's navigation buttons (e.g. an icon of an up arrow).

The server identifies each instance of a feature within the image by locating segments in the image which have the highest probability of being repeated. This process of identifying segments in the image may be performed quickly on a computing device by executing the operations in parallel on a graphics processing unit (GPU) or by utilizing the parallel instructions of a central processing unit (CPU).

Moving data between different parts of memory—such as between main system memory and video memory of the graphics processing unit (GPU) is an "expensive" operation, i.e. doing so requires a significant amount of time relative to other operations that are to be performed on the data or relative to the amount of time available with which to process the data. Where the image that is to be sent to the client (e.g. a rendered screen) is already resident in video memory, then keeping it in video memory and processing it with the GPU may avoid the need to perform a time-costly readback from video memory to system memory (where it may be executed upon by a logical processor).

In addition to addressing a problem with transfer time, a further advantage may lie in processing the image on the GPU as opposed to a logical processor. GPUs typically provide a way to perform simple operations very quickly on every pixel in an image. These GPU techniques often offer an order of magnitude in performance benefits over their logical processor-technique equivalent.

Yet another advantage lies in merely processing the image with the GPU. In doing so, this avoids using the CPU to perform equivalent operations, thus freeing the CPU to perform other tasks, and increasing the utilization of processing resources of a system.

Continuing with regard to connected segments, each such found segment is then said to be a feature, and is assigned a hash signature. Then, the server replaces the area that is occupied by each feature with a pre-determined value. The pre-determined value can be the dominant color of the area, or a repetition of the neighboring pixels, so as to maximize monochromatic run-lengths and therefore compression. Then, the server divides the image into tiles.

The server then caches the new features and new tiles. The server determines, which, if any of the features and tiles are already stored on a client computing device of the remote presentation session. Where the client has a feature or tile stored already, the server instructs the client to display it in its appropriate location within the image. Where the client does not have a feature or tile stored already, the server sends it to the client with an indication both to store it and to display it in its appropriate location within the image.

The disclosure encompasses systems, methods and computer-readable storage media for implementing these teachings.

It can be appreciated by one of skill in the art that one or more various aspects of the disclosure may include but are not limited to circuitry and/or programming for effecting the herein-referenced aspects of the present disclosure; the circuitry and/or programming can be virtually any combination of hardware, software, and/or firmware configured to effect the herein-referenced aspects depending upon the design choices of the system designer.

While the disclosure makes reference to "bitmap" images, it may be appreciated that these teachings may be applied to images represented in a variety of formats.

The foregoing is a summary and thus contains, by necessity, simplifications, generalizations and omissions of detail. Those skilled in the art will appreciate that the summary is illustrative only and is not intended to be in any way limiting.

BRIEF DESCRIPTION OF THE DRAWINGS

The systems, methods, and computer-readable media for accelerating bitmap remoting by identifying and extracting patterns from source bitmaps are further described with reference to the accompanying drawings in which:

FIG. 2 illustrates a sample image to be transmitted in a remote presentation session.

FIGS. 3-8 illustrate techniques for accelerating bitmap remoting by identifying and extracting patterns from source bitmaps.

FIG. 3A illustrates the sample image of FIG. 2 after it has been converted to a black-and-white representation of the image.

FIG. 3B illustrates the image of FIG. 3A after it has been segmented to identify one or more features.

FIG. 4 illustrates the identified features of FIG. 3B applied to the sample image of FIG. 2.

FIG. 7 illustrates exemplary operational procedures for a server accelerating bitmap remoting by extracting non-grid tiles from source bitmaps.

FIG. 8 illustrates exemplary operational procedures for a client accelerating bitmap remoting by extracting non-grid tiles from source bitmaps.

FIG. 9 illustrates operational procedures that may be used to perform the operations depicted by FIGS. 3A and 3B on a graphic processing unit of a computing device.

FIG. 9C depicts the image of FIG. 9B after an iteration of some of the operational procedures of FIG. 9 have been performed.

FIG. 9D depicts the image of FIG. 9C after an iteration of some of the operational procedures of FIG. 9 have been performed.

FIG. 9E depicts the image of FIG. 9D after an iteration of some of the operational procedures of FIG. 9 have been performed.

FIG. 9F depicts the image of FIG. 9E after an iteration of some of the operational procedures of FIG. 9 have been performed.

FIG. 10 illustrates operational procedures that may be used to perform the operations depicted by FIGS. 3A and 3B on a vector processor of a computing device.

FIG. 10A depicts a binary image upon which the operations of FIG. 10 may be executed.

FIG. 10B depicts the binary image of FIG. 10A after each black pixel has been assigned a value in operation 1006 of FIG. 10.

FIG. 10C depicts the image of FIG. 10B after it has been transposed in operation 1006 of FIG. 10.

FIG. 10D depicts the image of FIG. 10C after each pixel has been assigned a value in operation 1008 of FIG. 10.

DETAILED DESCRIPTION OF ILLUSTRATIVE EMBODIMENTS

Figure 1:
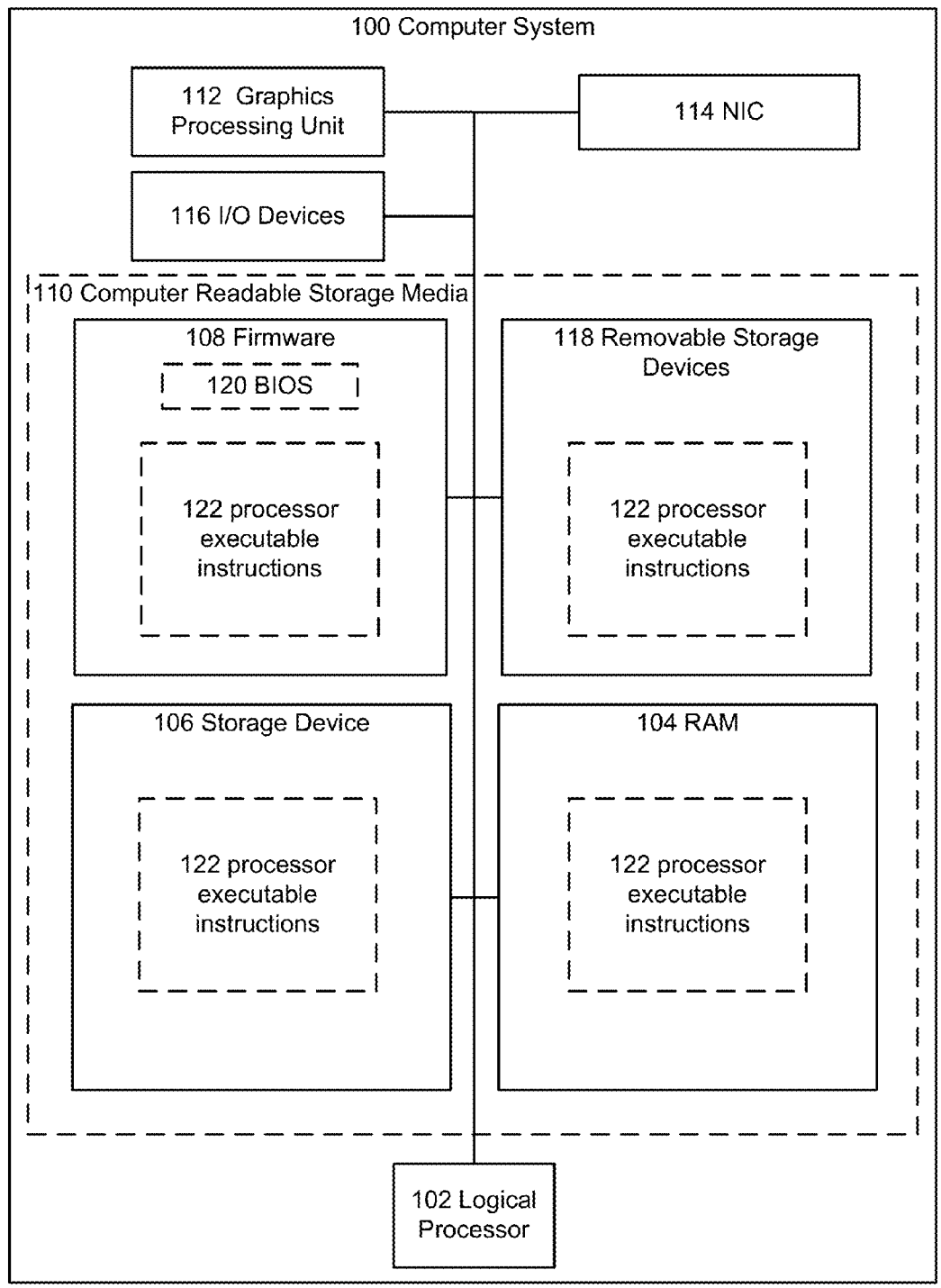
FIG. 1 illustrates an exemplary general purpose computing environment in which in which the techniques described herein may be embodied.

FIG. 1 is a block diagram of a general purpose computing device in which the techniques described herein may be employed. FIG. 1 and the following discussion are intended to provide a brief general description of a suitable computing environment in which the disclosure may be implemented.

The term circuitry used throughout the disclosure can include hardware components such as hardware interrupt controllers, hard drives, network adaptors, graphics processors, hardware based video/audio codecs, and the firmware used to operate such hardware. The term circuitry can also include microprocessors, application specific integrated circuits, and/or one or more logical processors, e.g., one or more cores of a multi-core general processing unit configured by firmware and/or software. Logical processor(s) can be configured by instructions embodying logic operable to perform function(s) that are loaded from memory, e.g., RAM (herein referred to as "system memory"), ROM, firmware, and/or mass storage. In an example embodiment where circuitry includes a combination of hardware and software an implementer may write source code embodying logic that is subsequently compiled into machine readable code that can be executed by a logical processor. Since one skilled in the art can appreciate that the state of the art has evolved to a point where there is little difference between hardware implemented functions or software implemented functions, the selection of hardware versus software to effectuate herein described functions is merely a design choice. Put another way, since one of skill in the art can appreciate that a software process can be transformed into an equivalent hardware structure, and a hardware structure can itself be transformed into an equivalent software process, the selection of a hardware implementation versus a software implementation is left to an implementer.

Referring now to FIG. 1, an exemplary computing system 100 is depicted. Computer system 100 can include a logical processor 102, e.g., an execution core. While one logical processor 102 is illustrated, in other embodiments computer system 100 may have multiple logical processors, e.g., multiple execution cores per processor substrate and/or multiple processor substrates that could each have multiple execution cores. As shown by the figure, various computer readable storage media 110 can be interconnected by one or more system busses which couples various system components to the logical processor 102. The system buses may be any of several types of bus structures including a memory bus or memory controller, a peripheral bus, and a local bus using any of a variety of bus architectures. In example embodiments the computer readable storage media 110 can include for example, random access memory (RAM) 104, storage device 106, e.g., electromechanical hard drive, solid state hard drive, etc., firmware 108, e.g., FLASH RAM or ROM, and removable storage devices 118 such as, for example, CD-ROMs, floppy disks, DVDs, FLASH drives, external storage devices, etc. It should be appreciated by those skilled in the art that other types of computer readable storage media can be used such as magnetic cassettes, flash memory cards, digital video disks, and Bernoulli cartridges.

The computer readable storage media 110 can provide non volatile and volatile storage of processor executable instructions 122, data structures, program modules and other data for the computer 100 such executable instructions that effectuate manager 250 described in the following figures. A basic input/output system (BIOS) 120, containing the basic routines that help to transfer information between elements within the computer system 100, such as during start up, can be stored in firmware 108. A number of programs may be stored on firmware 108, storage device 106, RAM 104, and/or removable storage devices 118, and executed by logical processor 102 including an operating system and/or application programs.

Commands and information may be received by computer 100 through input devices 116 which can include, but are not limited to, a keyboard and pointing device. Other input devices may include a microphone, joystick, game pad, scanner or the like. These and other input devices are often connected to the logical processor 102 through a serial port interface that is coupled to the system bus, but may be connected by other interfaces, such as a parallel port, game port or universal serial bus (USB). A display or other type of display device can also be connected to the system bus via an interface, such as a video adapter which can be part of, or connected to, a graphics processing unit (GPU) 112 having access to video memory. In addition to the display, computers typically include other peripheral output devices (not shown), such as speakers and printers. The exemplary system of FIG. 1 can also include a host adapter, Small Computer System Interface (SCSI) bus, and an external storage device connected to the SCSI bus.

Computer system 100 may operate in a networked environment using logical connections to one or more remote computers, such as a remote computer. The remote computer may be another computer, a server, a router, a network PC, a peer device or other common network node, and typically can include many or all of the elements described above relative to computer system 100.

When used in a LAN or WAN networking environment, computer system 100 can be connected to the LAN or WAN through a network interface card (NIC) 114. The NIC 114, which may be internal or external, can be connected to the system bus. In a networked environment, program modules depicted relative to the computer system 100, or portions thereof, may be stored in the remote memory storage device. It will be appreciated that the network connections described here are exemplary and other means of establishing a communications link between the computers may be used. Moreover, while it is envisioned that numerous embodiments of the present disclosure are particularly well-suited for computerized systems, nothing in this document is intended to limit the disclosure to such embodiments.

Figure 2:
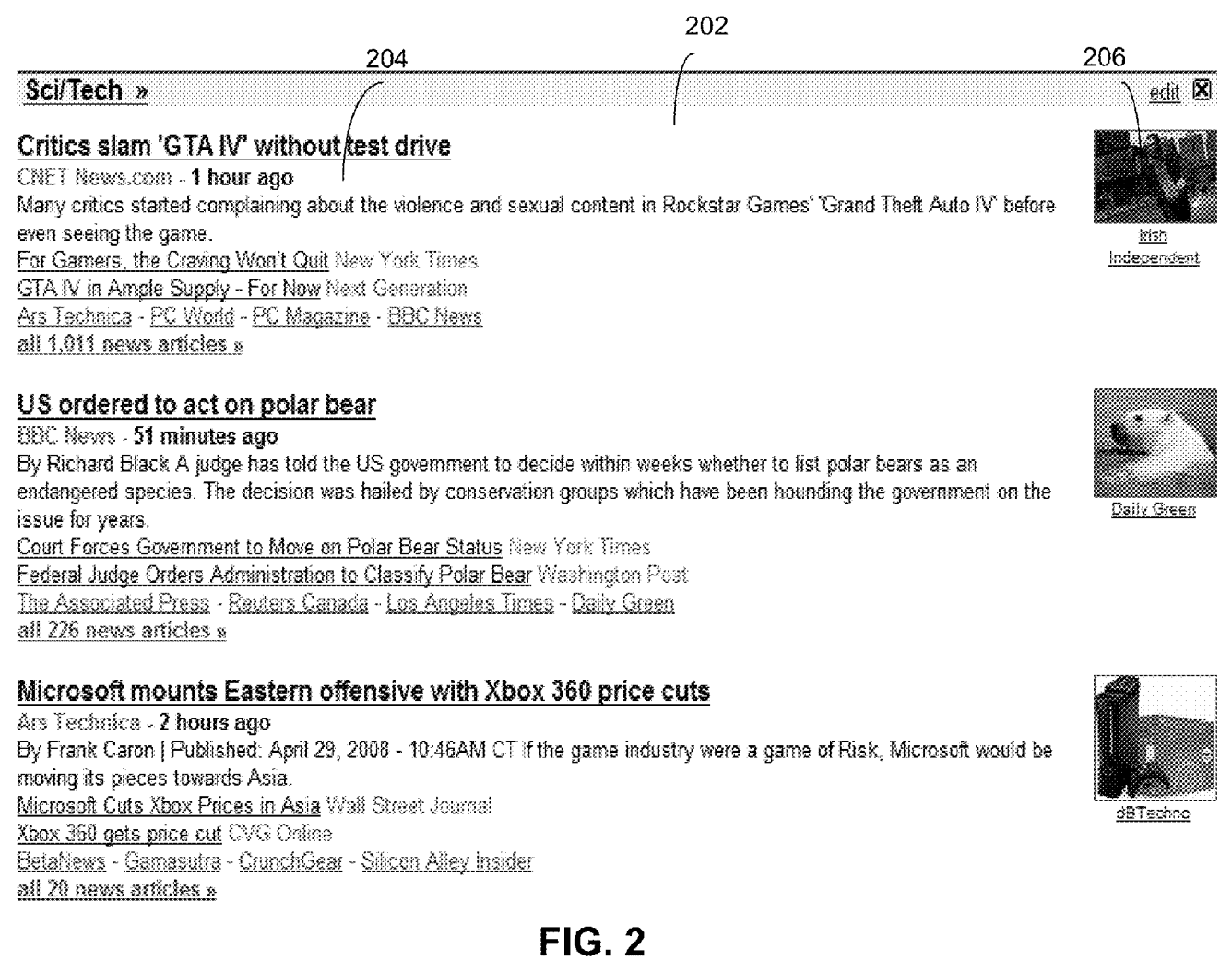

FIG. 2 illustrates a sample image 202 to be transmitted in a remote presentation session. Image 202 contains both text 204 and a sub-image 206. This image may comprise an entire computer desktop, or some subset thereof, such as a window for an application.

Image 202 may be received by a server at the video memory of a GPU (like GPU 112 of FIG. 1) as image 202 is rendered for display. The server may then process the image according to the following techniques and transmit it to a client with which it is conducting a remote presentation session for display on the client's display device. In an embodiment, the server comprises the computing device of FIG. 1.

FIG. 3A illustrates sample image 202 of FIG. 2 after it has been converted to a black-and-white representation of the image 302. This may be accomplished using a thresholding scheme. In a thresholding scheme, all pixel values (e.g. the luminance value, which may be calculated as a weighted sum of a pixel's red, green and blue values when expressed in RGB) of an image below a threshold may be set to black (in RGB, this may be expressed as 0x000000), and all pixel values of an image above the threshold may be set to white (in RGB, this may be expressed as 0xFFFFFF).

FIG. 3B illustrates image 302 of FIG. 3A after it has been segmented to identify one or more features 302b. In an embodiment, the server may segment image 202 directly. Depending on specifics of the overall session system—such as available client and server processing resources and bandwidth—the optimal feature size for session performance may vary. In embodiments, a feature may be a word, some subset of a word (including a letter), an application's navigation icon (such as a "print document" button), or a sub-image within the image to be sent in the remote presentation session (such as an image displayed by a web browser when the web browser window is to be sent in the session). A feature may be thought of as having a boundary—a perimeter that encompasses the feature. In the embodiments depicted, the boundaries are rectangular in shape. However, it is possible to use the present techniques with boundaries of a variety of shapes.

In an embodiment, the client discussed herein may comprise the computing device of FIG. 1.

In an embodiment, the server and client communicate in the course of the remote presentation session to determine a feature granularity to be used. This may be negotiated when the server and client initiate the remote presentation session. This may also be renegotiated during the course of the remote presentation session as the parameters of the session change, such as if the client's available processing resources are diminished.

Figure 9:
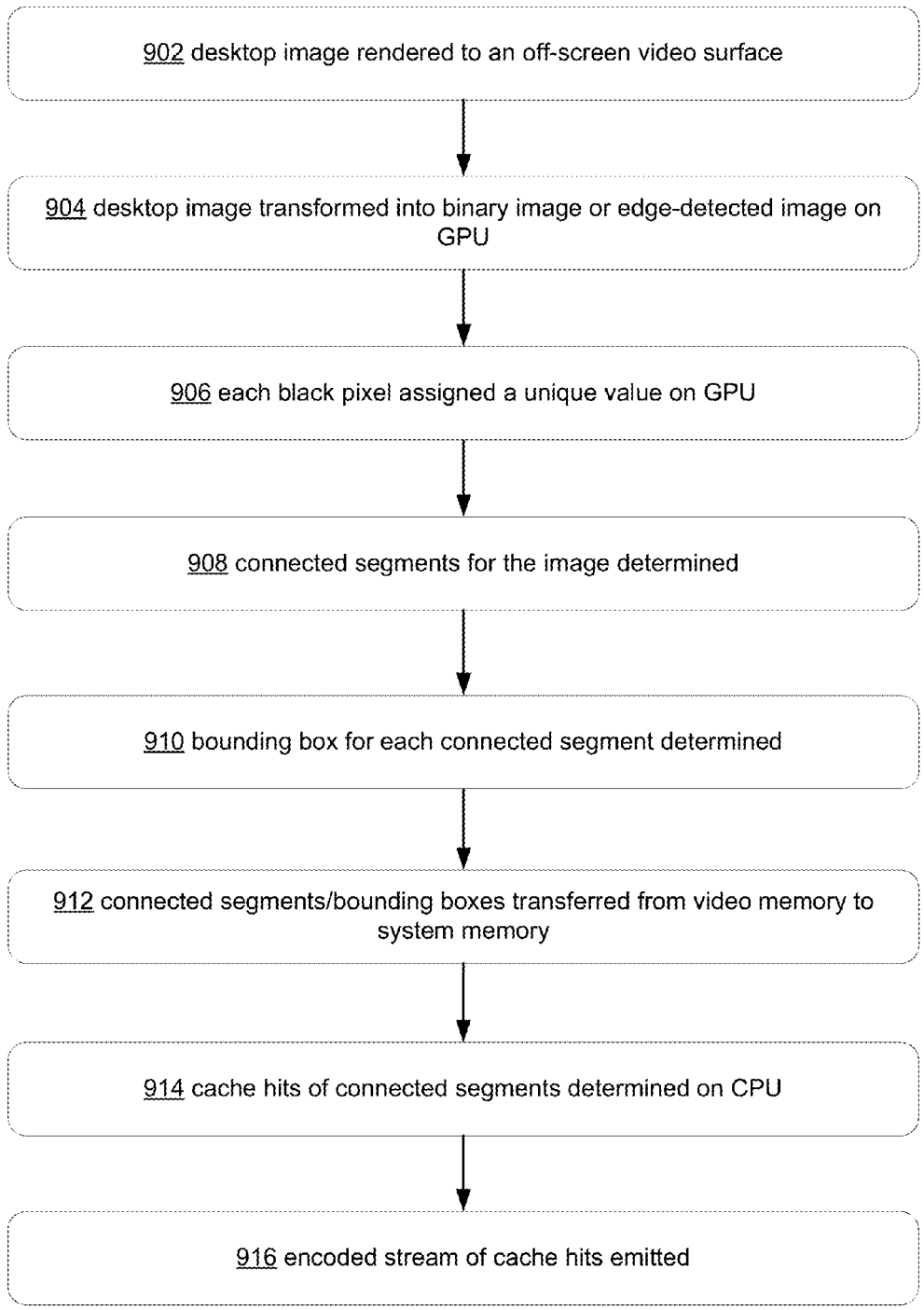
FIGS. 9 and 10 illustrate parallel processing techniques for determining features in an image.
Figure 10:
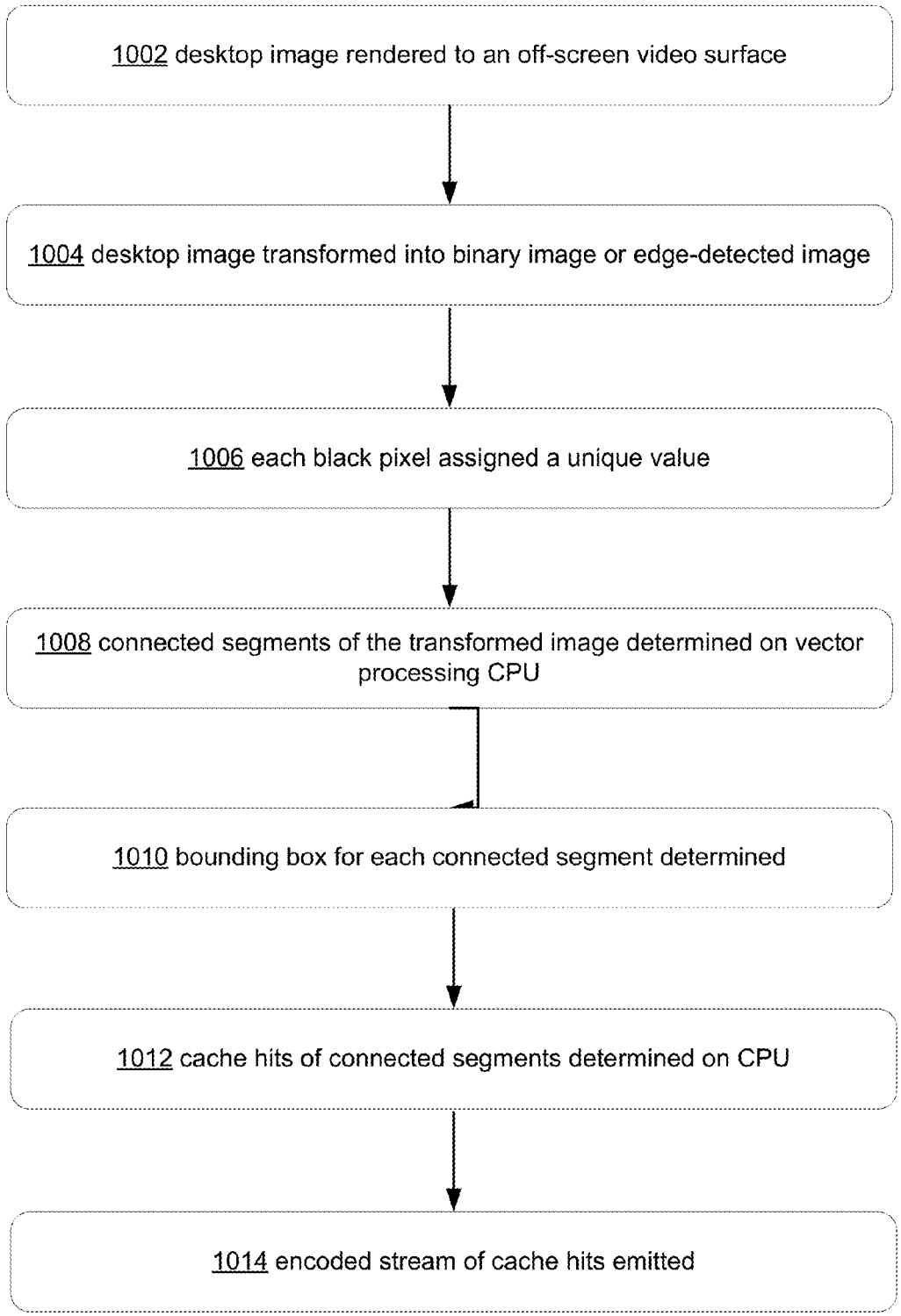

In an embodiment, the server identifies the features of image 302 by processing image 302 with a connected segments algorithm to determine a set of pixels that comprises each connected segment (such as is discussed with respect to FIGS. 9 and 10). The connected segments algorithm determines a bounding box for the features of the image. These bounding boxes may then be applied back to image 302 to determine the boundaries of each feature relative to image 302 as a whole.

The server may perform the connected segments algorithm as follows. It labels each pixel of image 302 as being part of text or the background by using an intensity threshold—if the pixel is black or close to black, it is considered text, and otherwise it is considered background (if the image comprised light colored text on a dark background, this would be reversed). The server then finds all 4-connected groups of pixels of those pixels determined to be text. A pixel may be considered to be 4-connected if it is immediately to the right, left, above or below a pixel determined to be text. In an embodiment, the server finds all 8-connected groups of pixels (the 4-connected groups, plus those only connected diagonally) rather than all 4-connected groups of pixels. The server then determines a bounding box for each 4-connected group of text pixels. In an embodiment the bounding box is a rectangle made up of horizontal and vertical lines that encompasses the 4-connected group of pixels such that no smaller bounding box exists.

Figure 4:
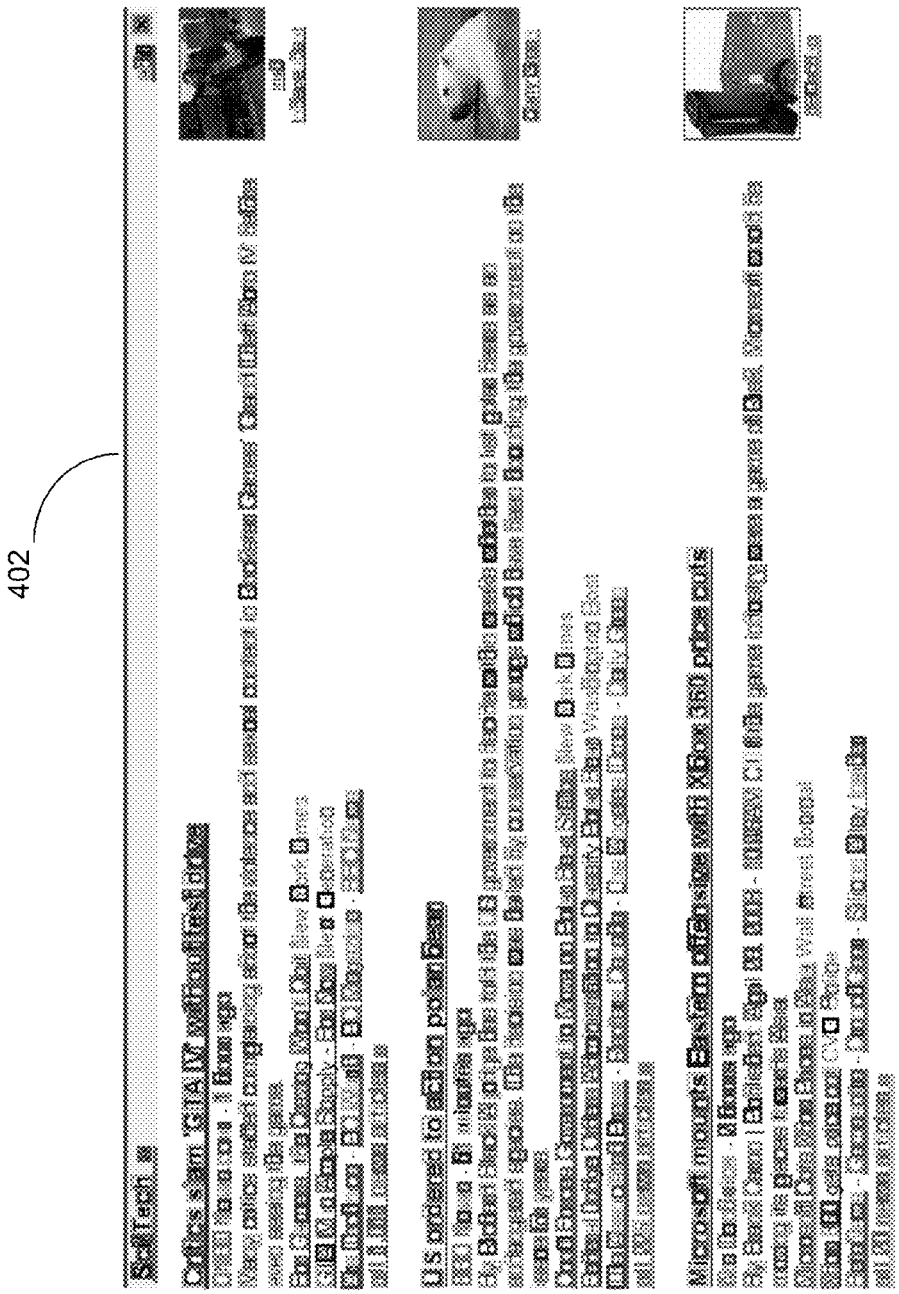

FIG. 4 illustrates in image 402 the identified features of image 302b applied to image 202. When the features are identified relative to original image 202, then that image 202 may be processed to separate the features from the rest of the image.

Figure 5A:
FIG. 5A illustrates another sample image, similar to that of FIG. 2, to be transmitted in a remote presentation session.

FIG. 5A illustrates another sample image 502, similar to that of FIG. 2, to be transmitted in a remote presentation session.

Figure 5B:
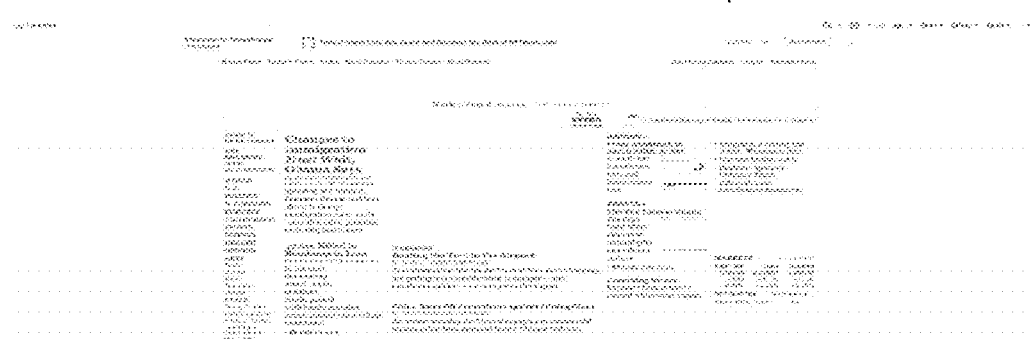
FIG. 5B illustrates a text-only segmentation of the image of FIG. 5A.

FIG. 5B illustrates a text-only segmentation 502b of image 502 of FIG. 5A. It may aid the techniques disclosed herein to separate the text and image portions of image 202 and then perform operations on each sub-image. In an embodiment where this segmentation operation is performed, text-only segmentation may be performed by performing an optical character recognition (OCR) algorithm on the image and removing from the image anything that is not a recognized character.

Figure 5C:
FIG. 5C illustrates a non-text segmentation of the image of FIG. 5A.

FIG. 5C illustrates a non-text segmentation 502c of image 502 of FIG. 5A. Where the server executes the OCR algorithm described in the detailed description of FIG. 5B, the server may produce image 502c by removing every character that the OCR algorithm identifies.

Figure 6A:
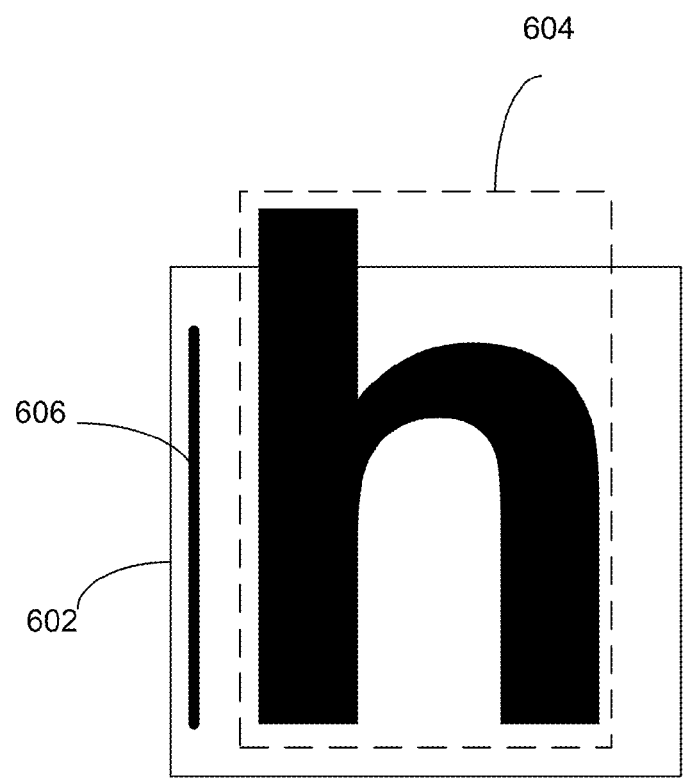
FIG. 6A illustrates a tile that partially contains a feature.

FIG. 6A illustrates a tile 602, a portion of which contains a portion of a feature 604. The letter "h" comprises feature 604. A portion of feature 604 extends above tile 602. Also in tile 602 is object 606. In an embodiment, object 606 may be identified as a feature, or as part of feature 604.

Figure 6B:
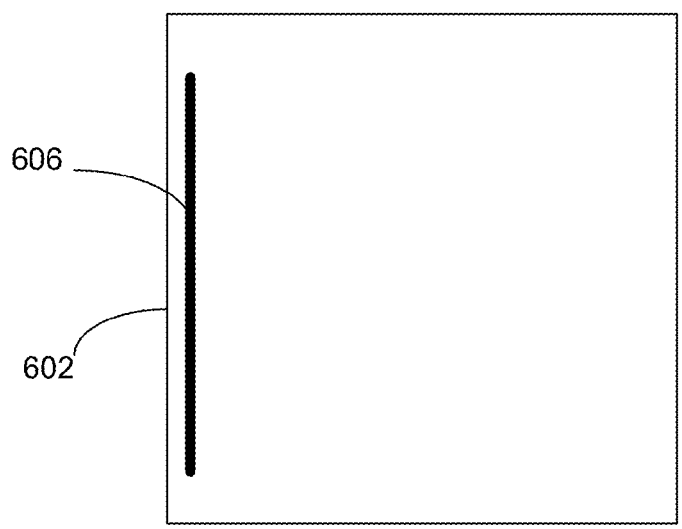
FIG. 6B illustrates the tile of FIG. 6A after the feature has been removed and replaced with the dominant characteristic of the tile.

FIG. 6B illustrates tile 602 of FIG. 6A after the feature 604 has been removed and replaced with the dominant characteristic of the tile. "Dominant characteristic" is used herein to denote an image that, if used to replace the feature in the tile, will aid in compressing the tile. Often, the dominant characteristic of a tile is the dominant color of a tile—the one color found most often within the portion of the tile unoccupied by the feature. In the present embodiment, despite the presence of object 606, the dominant characteristic is the white background that occupies most of the tile, so feature 604 is replaced with all white.

In an embodiment where the feature occupies the entire tile, the tile may be thought of as having no dominant characteristic, not having a portion unoccupied by the feature from which to determine such a dominant characteristic. In this case, the feature may be replaced with an image that is easily compressible, such as a solid color. It may be beneficial to use the same dominant characteristic for all such tiles that are completely occupied by features, as that would increase the number of cache hits for the tiles, and therefore reduce the number of tiles that need to be sent to the client.

Figure 7:
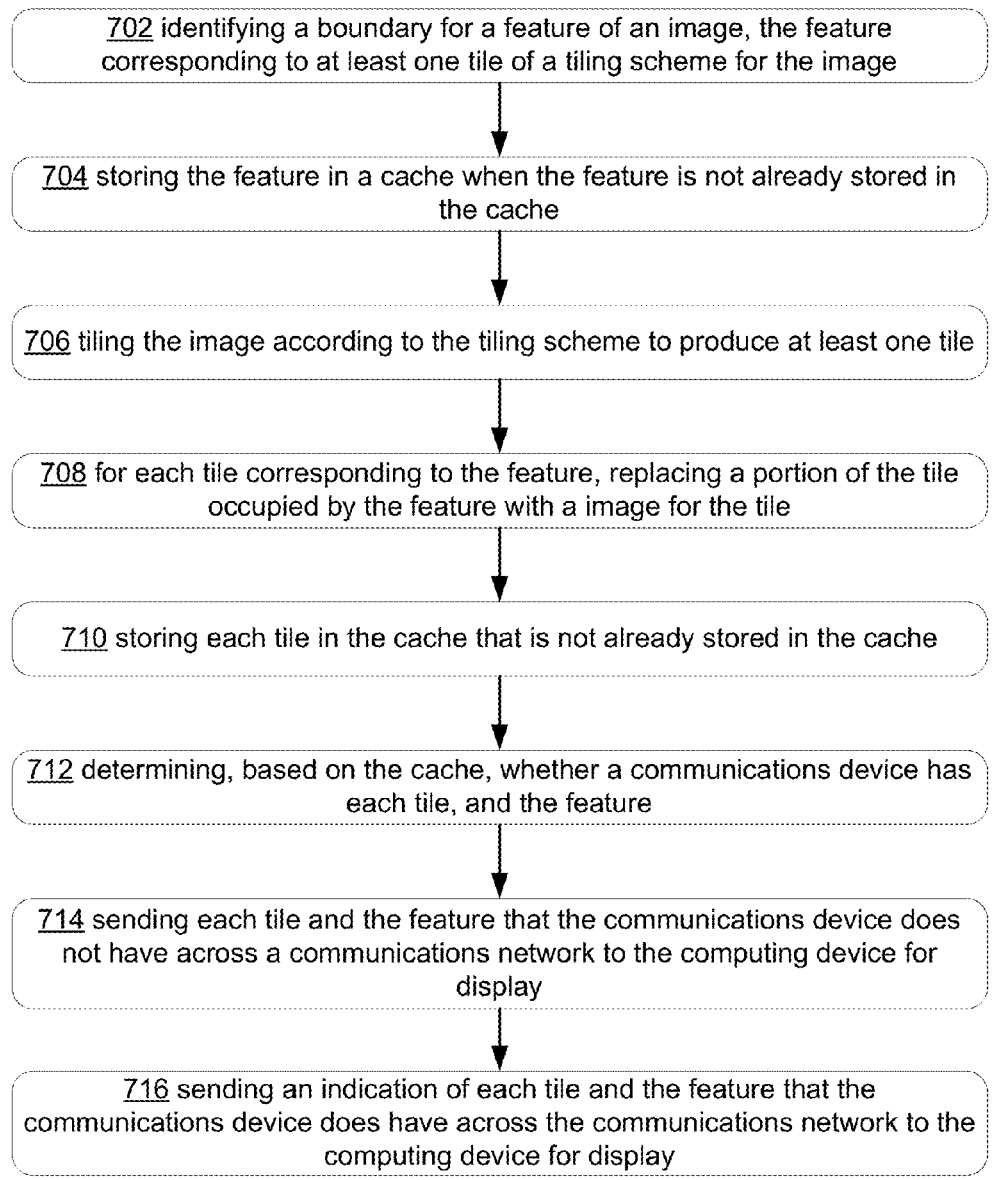

FIG. 7 illustrates exemplary operational procedures for a server accelerating bitmap remoting by extracting non-grid tiles from source bitmaps. In discussing the operating procedures depicted in this and other figures, it should be appreciated that not every operation must be executed in every embodiment of the present disclosure, but that many functional subsets and permutations of these operational procedures may be implemented.

Operation 702 depicts identifying a boundary for a feature of an image, such as image 202, the feature corresponding to at least one tile of a tiling scheme for the image. This may be accomplished, for example, by using the techniques discussed previously with regard to FIGS. 3 and 4. In an embodiment, the tiling scheme involves dividing the image into a grid of rectangular tiles. A feature is not restricted to this grid and may occur over all or part of a plurality of tiles, part of a single tile, or occupy exactly one tile.

In an embodiment, identifying a boundary for a feature of an image is based on a feature granularity and is performed by a host communications device. A feature granularity may be something that affects how a feature is recognized, such as a size. In an embodiment, the feature granularity may indicate that individual letters are to be treated as separate features. In an embodiment, the feature granularity may indicate that individual words are to be treated as separate features.

In an embodiment the feature granularity is determined by a characteristic of the server (or "host communications device"), the client (or "communications device"), or the communications network. A characteristic of the host communications device, the communications device, or the communications network may be something that affects performance of the remote presentation session, such as the size of a packet sent across the communications network, or the particularities of the system architecture of the host communications device.

In an embodiment, identifying a boundary comprises producing a black-and-white representation of the image as discussed with regard to FIG. 3. In an embodiment, producing a black-and-white representation of the image comprises processing the image according to a thresholding scheme as discussed with regard to FIG. 3. In an embodiment, identifying a boundary for a feature comprises processing the image with a connected segments algorithm as discussed with regard to FIG. 4.

In an embodiment, the feature comprises text, and identifying a boundary for the feature comprises processing the image with an optical character recognition (OCR) algorithm. The resulting text may be stripped from the image, such as by replacing it within each tile of the image with the dominant characteristic of each tile, as discussed in more detail below. Then the tiles may be sent, along with the text (such as expressed in American Standard Code for Information Interchange—ASCII—format), and an indication of where to overlay the text on the tiles, as discussed in more detail below.

In an embodiment, the feature comprises a horizontal or vertical line. The server may perform a run-length counting algorithm on the image, both vertically and horizontally. This algorithm will determine strings of matching or closely matching linear pixels (such as those pixels that are all above or below a threshold value). These lines may then be extracted from each tile of the image, such as by replacing it within each tile of the image with the dominant characteristic of each tile, as discussed in more detail below. The lines may then be separately encoded (such as by indicating start and stop coordinates within the image, the line color, and the line width), and sent to the client for display with the tiles, as discussed in more detail below.

In an embodiment, the feature comprises a screen-to-screen move (or "screen-to-screen blit"), such as when a window is scrolled, and identifying a boundary for the feature comprises processing the image to determine a motion vector of a portion of the image relative to a portion of the prior image. The server may match motion vectors between a plurality of images that are sent, or to be sent, to the client. The server may match motion vectors by determining patterns of where image characteristics, such as text and lines (as determined in the image using the above techniques) have moved. This may then be represented to the client, by using much less bandwidth than sending each tile, such as by indicating in which direction and how far the image has moved.

These techniques with regard to features may be run in combination—e.g. both text and lines may be extracted from an image that is scrolled.

Operation 704 depicts storing the feature in a cache when the feature is not already stored in the cache. A server may maintain a cache of features, such as by performing a hash algorithm on each feature as it is encountered, and storing a signature of the feature in the cache based on the results of the hash algorithm, and a corresponding position of the feature where it will be stored in a client cache. The signature of the feature may be stored rather than the feature itself to minimize storage requirements. In doing so, as each new feature is encountered, the server may determine whether the feature has been previously encountered, so only a reference to the feature must be sent to the client (the case where a cache hit is determined, and it is further determined that the feature is identical to a feature stored in the cache that caused the hit), or that the feature has not been previously encountered, so that the feature itself must be sent to the client (the case where there is no cache hit, which indicates that an identical feature has not been encountered previously).

In an embodiment, a cache has a maximum size, and thus a limited horizon. Thus, when a cache has reached its maximum size, a determination is made on which features and/or tiles must be removed to make room. This determination may be made based on a heuristic of which features and/or tiles are least likely to be repeated, and therefore least beneficial to have in the cache. Similarly, where the cache has reached its maximum size, or may reach its maximum size, a similar determination may be made concerning whether to add a new feature and/or tile to the cache.

In an embodiment, a cache comprises a highly structured (hierarchical) cache. Such a highly structured cache may be organized based on different levels of granularity—such as features, groups of features, and groups of groups of feature. For instance, where features like "a," "n," and "d" are encountered, groups of those features—the word "and" may be encountered as well. And groups that comprise such groups of features—such as phrases that contain the word "and" may be encountered as well. These groups of features may be cached in addition to the features themselves.

Operation 706 depicts tiling the image according to the tiling scheme to produce at least one tile, similar to the tile of FIG. 6. In an embodiment, a tile has the dimensions of 12 pixels by 12 pixels, unless the image does not have dimensions that are an even multiple of 12 pixels. In that case, no more than one tile in each column and one tile in each row may have dimensions of less than 12 pixels by 12 pixels.

Operation 708 depicts for each tile corresponding to the feature, replacing a portion of the tile occupied by the feature with a image for the tile. This may be accomplished, for example, by using the techniques discussed previously with regard to FIGS. 6A and 6B.

Operation 710 depicts storing each tile in the cache that is not already stored in the cache. In an embodiment, storing a tile is effectuated similar to storing a feature as discussed in operation 704. In an embodiment, tiles and features are stored in separate caches. In an embodiment, tiles and features are stored in a single cache. As it more likely that a tile will collide with a tile and a feature will collide with a feature, than one with the other, there may be performance benefits on certain systems to using two caches. Likewise, the particulars of a given system may favor the use of a single cache.

Operation 712 depicts determining, based on the cache, whether a communications device has each tile, and the feature. In an embodiment, this communications device is the client. As the server sends tiles and features to the client, the client caches those tiles and features in one or more caches of its own. The client cache may comprise a stored tile or feature and a corresponding result of the hash algorithm performed on the tile or feature, So, if the server determines that a tile or feature that represents the same image as the present tile or feature already exists in its cache (done by looking at feature signatures), it has determined that the client already has the tile or feature in its cache (or will be sent the tile or feature in transmitting data for the current image). If there is no cache hit, then the client does not have the tile or feature. If there is a cache hit, and the server determines that no previously cached tile or feature that caused the hit (within the cache horizon) is identical to the present tile or feature, then the client does not have the tile or feature. Otherwise, the server determines that the client does (or soon will) have the tile or feature.

Operation 714 depicts sending each tile and the feature that the communications device does not have across a communications network to the computing device for display. Each tile and feature that the client does not have may be determined according to the techniques of operation 712. In an embodiment, each tile and feature is sent as a separate image within the context of the active remote presentation session. In an embodiment, the server may improve session performance by grouping together features into a single bitmap of features and/or tiles, and sending this compound bitmap to the client along with an indication of which portion of the compound bitmap corresponds to each feature and tile. In an embodiment, a separate compound bitmap may be used each for features and for tiles. This encoding of feature(s) and tile(s), and indications to the same, may be referred to as a "stream."

In an embodiment, at least some of the tiles and features sent to the client are first compressed before they are sent, and then uncompressed by the client after it has received them.

Operation 716 depicts sending an indication of each tile and the feature that the communications device does have across the communications network to the computing device for display. Each tile and feature that the client has may be determined according to the techniques of operation 712. For instance, a tile may be accompanied by two integral values—one that indicates a number of pixels below the upper left hand corner that the upper left hand corner of the tile is to be placed, and one that indicates a number of pixels to the right of the upper left hand corner that the upper left hand corner of the tile is to be placed In an embodiment, the tile(s), feature(s) and indication(s) thereof sent according to the techniques of operations 714 and 716 are sent along with an indication of where the client is to place the corresponding tile or feature in the image that it recreates.

FIG. 8 illustrates exemplary operational procedures for a client accelerating bitmap remoting by extracting non-grid tiles from source bitmaps. It should be appreciated that not every operation must be executed in every embodiment of the present disclosure, but that many functional subsets and permutations of these operational procedures may be implemented.

Operation 802 depicts receiving a plurality of tile indications, each tile indication comprising an tile or a location in a cache of a tile, and a location to display each tile indication on a grid.

Operation 804 depicts receiving a feature indication, the feature indication comprising a feature or a location in the cache of a feature, and a location to display the feature.

In an embodiment where, the feature indication comprises a plurality of features, as discussed in more detail with regard to FIG. 7, and an indication of the location of each feature within the feature indication, the client may determine each feature within the feature indication based on each indication of the location of each feature.

In an embodiment, the feature comprises text, a line, or a motion between the image and a previously received image. In an embodiment where the feature comprises text, the feature indication comprises an indication of a font with which to display the text.

Operation 806 depicts displaying an image, the image comprising each tile indication on the grid overlaid with the feature.

FIG. 9 illustrates operational procedures that may be used to perform the operations depicted by FIGS. 3A and 3B in parallel operations on a graphic processing unit of a computing device. The computing device may comprise computing device 100 depicted in FIG. 1. The GPU may comprise GPU 112 depicted in FIG. 1.

In a MICROSOFT WINDOWS® operating system, this may comprise performing a GPU pipeline of algorithms using DIRECTX® 11 pixel shaders or equivalent GPU programming models such as CUDA (Compute Unified Device Architecture) or OpenCL (Open Computing Language). The input to the pipeline may be the image to be transferred in a remote presentation session (such as the screen video surface), and the output may be a set of compressed or pre-compressed connected segments that have been processed on the GPU. These connected segments may be treated as "features" as discussed elsewhere in the disclosure.

Operation 902 depicts a server rendering the contents of its desktop to an offscreen video surface in video memory of a GPU. The desktop may comprise the image to be transferred to the client. An indication of this render occurring may be received from the graphics subsystem comprising the GPU that the screen has been updated. This indication may be received on triggering of a periodic timer, or an explicit notification from an operating system that the screen contents have changed. This notification may comprise a reference or pointer to the video memory surface representing the screen contents. In a MICROSOFT WINDOWS® operating system, this surface could be a DIRECTX® surface.

Operation 904 depicts an edge-detection operation of executing GPU pixel shaders on the received image to produce an edge-detected image. This edge-detected image may comprise a binary (e.g. black and white) image.

Where the image it converted to a binary representation of the image, this can be done entirely with a pixel shader. The following programming code, in a C-type syntax, when executed on a computing device (like computer 100 of FIG. 1), may accomplish this. It should be appreciated that with this code, as well as other example code disclosed, the use of code is for illustrative purposes and not to limit the present techniques to a single embodiment. It may also be appreciated that the operations expressed in this code may be implemented entirely in hardware, or in some combination of hardware with code executed thereon.

```
int intensity = (pix->r + pix->g + pix->b) /3;
if (intensity > THRESHOLD_VALUE) {
    output = 1; //binary pixel on
}
else {
    output = 0;
}
```

"pix" refers to the pixel being processed, and "r," "g," and "b" the components of its RGB color value (it may be appreciated that the present techniques may be implemented where pixel colors are represented in other ways, such as YPbPr).

Another way to edge detect the image instead of converting it to a binary image is to perform Sobel-operator-type edge processing on the GPU. Such processing calculates the image gradient of the image intensity at each pixel, giving the direction of the largest possible increase from light to dark and the rate of change in that direction. The result therefore shows how "abruptly" or "smoothly" the image changes at that point, and therefore how likely it is that that part of the image represents an edge, as well as how that edge is likely to be oriented.

The pixel shader to do this may be implemented as computer-executable code that performs logical operations similar to those expressed in the following pseudo-programming code in a C-style syntax:

```
_inlinefloat COMPUTE_PIXEL_STRENGTH(float tx, float ty)
{
    ULONG pixVal = TEXTURE_FETCH(tx, ty);
    XRGBA* pix = (XRGBA*)&pixVal;
    return (pix->r + pix->g + pix->b) /3.0f
}
kernel floatSobelPixel(int c, int r)
{
    float Output;
    float L00 = PIXEL_LUM( c-1, r-1, srcImage);
    float L01 = PIXEL_LUM( c+0, r-1, srcImage);
    float L02 = PIXEL_LUM( c+1, r-1, srcImage);
    float L10 = PIXEL_LUM( c-1, r, srcImage);
    float L12 = PIXEL_LUM( c+1, r, srcImage);
    float L20 = PIXEL_LUM( c-1, r+1, srcImage);
    float L21 = PIXEL_LUM( c+0, r+1, srcImage);
    float L22 = PIXEL_LUM( c+1, r+1, srcImage);
    ULONG pixCur = srcImage.GetPixel(c, r);
    ULONG pixPrev = prevImage.GetPixel(c, r);
    if (pixCur == pixPrev) {
        deltaImage [r*width + c] = 0;
    }
    else {
        deltaImage [r*width + c] = 1;
    }
// Horizontal kernel
floatsobel_Horiz = -2 * L10 - L20 + L02 + 2 * L12 + L22;
// Vertical kernel
floatsobel_Vertical = -2 * L01 - L02 + L20 + 2 * L21 + L22;
floatsobelVal = (float)(sobel_Horiz * sobel_Horiz + sobel_Vertical * sobel_Vertical);
if (sobelVal<sobel_threshold)
```

```
    {
        Output = 0;
    }
    Else {
        Output = 1;
    }
    return Output;
}
```

Operations 906-910 depict segmenting the edge-detected image to determine connected segments of the image, and determining a bounding box for each such connected segment. A bounded connected segment (the bounding box including the connected segment contained within) may be used as a feature in the operating procedures of FIG. 7.

Operation 906 depicts assigning each black pixel a unique value.

Each black pixel (the image being black and white; in an embodiment where the background is primarily black and the features on it are white, these operations may instead be performed on the white pixels) is assigned a unique value. Each pixel occupies a unique space, so a pixel's coordinates comprise a unique value for the pixel. For instance, a 16-bit integer representing a pixel's relative x-coordinate (such as relative to the upper left-corner of the image may be appended with a 16-bit integer representing the pixel's relative y-coordinate. So, if the pixel's x-coordinate is 0x0004 and its y-coordinate is 0x000F, the resulting unique value may be the 32-bit 0x0004000F. It may be appreciated that there are a number of ways to assign a unique value to each pixel (such as sequentially with the first pixel encountered being assigned 0, and the last pixel encountered being assigned a number equal to the number of pixels), and this embodiment is merely illustrative.

Each white pixel may be assigned a null value that may be disregarded in successive operations, such as 0xFFFFFFFF (assuming that the image is smaller than 65,535 pixels in both dimensions, so that a black pixel at (65,535, 65,535) is not assigned that value).

Operation 908 depicts determining connected segments of the image based on the unique values of the pixels determined in operation 906.

Each black pixel now having a unique value, multiple iterations of an operation on each pixel are carried out to use these unique values to determine connected segments (in an embodiment where the connected segments are sufficiently small, all connected segments may be determined through one iteration). Each iteration compares the value of the current pixel and each of the adjacent eight pixels (there will be fewer adjacent pixels if the current pixel is at the edge of the image; in an embodiment where the present techniques use 8-connected groups of pixels), and assigns the pixel the minimum value among those nine pixels (in an embodiment, the maximum value of the assigned pixels may be assigned; the value chosen—whether minimum or maximum—may be thought of as the "extreme value"). The value of a pixel as considered here is the value of the pixel at the start of the iteration, and not any value that an adjacent pixel was assigned during the present iteration before the iteration is performed on the current pixel.

These iterations may be performed until an iteration is performed where no pixel is assigned a new value. At this point, all pixels within a connected segment will have the same value, and the pixels of a connected segment will all have a value that is unique as against the pixels of any other connected segment.

In an embodiment, fewer iterations than this may be performed, such as if there is a limit to the amount of time in which iterations may be performed. Where this happens (as well as with respect to the iterations discussed with regard to FIG. 10), the present operational procedures still may function to produce connected segments. Rather than one monolithic connected segment, such a limited-iteration technique may assign one connected segment a few unique values, such that the connected segment is sub-divided into portions of connected segments based on which pixels have which of these few unique values. Such "sub-connected segments" may still be used for feature extraction and caching as disclosed.

In an embodiment where fewer iterations are performed, these fewer iterations may be based, for instance, on the expiration of a timer or a specified number of iterations.

Operation 910 depicts determining a bounding box for each connected segment. After determining the connected segments, the bounding box of a connected segment may then be identified. Each pixel of a connected segment may be traversed to find the pixel with the greatest and least x-coordinates and greatest and least y-coordinates. The upper left corner of the bounding box is the least x-coordinate of all the pixels coupled with the least y-coordinate of all the pixels. The lower right corner of the bounding box is the greatest x-coordinate of all the pixels coupled with the greatest y-coordinate of all the pixels. It may be appreciated that upper right (greatest x-coordinate and least y-coordinate) and lower left (least x-coordinate and greatest y-coordinate) corners may be used to define the bounding box, as well.

For instance, and with respect to FIG. 9F, which is discussed in more detail further in the detailed description, the smallest and largest x-coordinates for any pixel with value 2 are 0 and 2, respectively. The smallest and largest y-coordinates for any pixel with value 2 are 1 and 6, respectively. Thus, the bounding box for the connected segment with value 2 may be defined by having an upper-left corner at (0, 1), and a lower right corner at (2, 6). Note that this bounding box encompasses white pixels that are not part of the connected segment itself.

Bounding boxes may overlap where the bounding box of a first connected segment includes an area proscribed by the bounding box of a second connected segment. In such a case, these bounding boxes may be left to overlap and contain redundant data. In another embodiment, collision detection of bounding boxes may occur, and the bounding boxes may be re-calculated so that they do not overlap.

Operations 906-910 may be implemented through the use of pixel shaders on the GPU, similar as discussed with respect to operation 904. In doing so, operations 906-910 may be performed without transferring the image data out of video memory. As discussed with respect to operation 912, the connected segments are sent from video memory to system memory. This operation may occur before one or more of operations 906-910, and the operations that then occur after it may occur on a logical processor, like logical processor 102 of FIG. 1. A transfer back to video memory may occur within operations 906-910 before a second transfer back to system memory for operation 914, and this will not affect performance where the time lost in these transfers is gained through increased processing speed by performing all or part of an operation or operations in system memory or video memory, as opposed to the other memory.

Operation 912 depicts sending the connected segments from video memory to system memory. It may be appreciated that the main processing of operations 902-910 occurs on the GPU, so that there is time cost in those operations of transferring the image data between video memory of the GPU and system memory, where it can be processed by the CPU. After operations 902-910, the image data is transferred to system memory in operation 910, where further processing Occurs.

Operation 914 depicts caching these identified connected segments as features, encoding a stream to represent occurrences of cache hits of these features to replace the bitmap contents in the image, as depicted in FIGS. 4 and 7.

Operation 916 depicts sending the encoded stream to a client in a remote presentation session, as depicted in FIG. 7.

It may be appreciated that operations 914-916 operate on the image data as it is stored in system memory. Thus, with operations 902-910 operating on the image data as it is stored in video memory, in performing operations 902-916 only one transfer of the image data between video memory and system memory (in either direction) need occur, saving time as compared to where multiple such transfers occur.

Figure 9A:
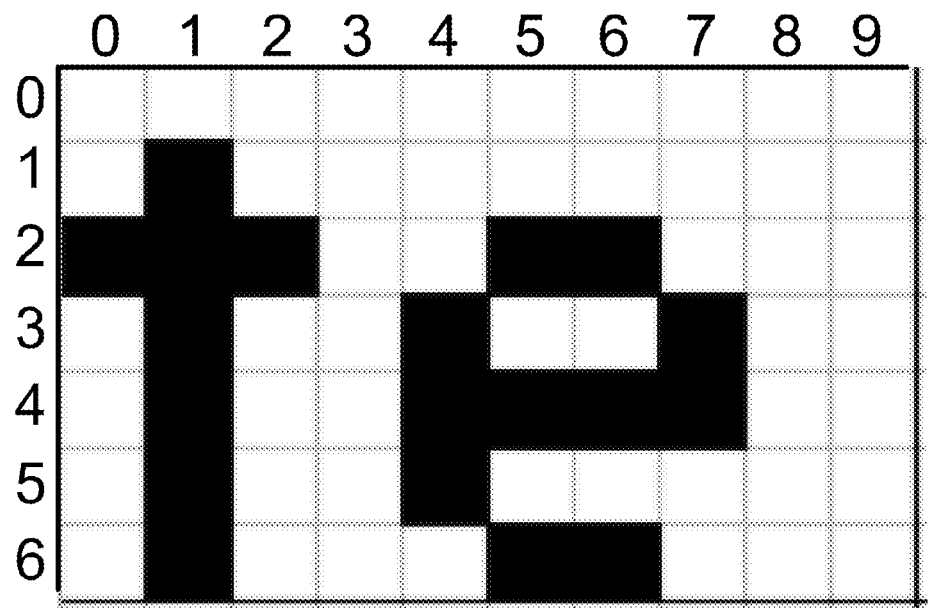
FIG. 9A depicts an image upon which the operational procedures of FIG. 9 may be performed.

FIG. 9A depicts an image upon which the operational procedures of FIG. 9 may be performed. The image has 10 pixels along the horizontal axis, marked left-to-right from 0-9, and 7 pixels along the vertical axis, marked top-to-bottom from 0-6. Thus, the position of the pixel in the upper left corner may be thought of as (0, 0), and the position of the pixel in the lower right corner may be thought of as (9, 6). The image depicts the characters "t" and "e."

Figure 9B:
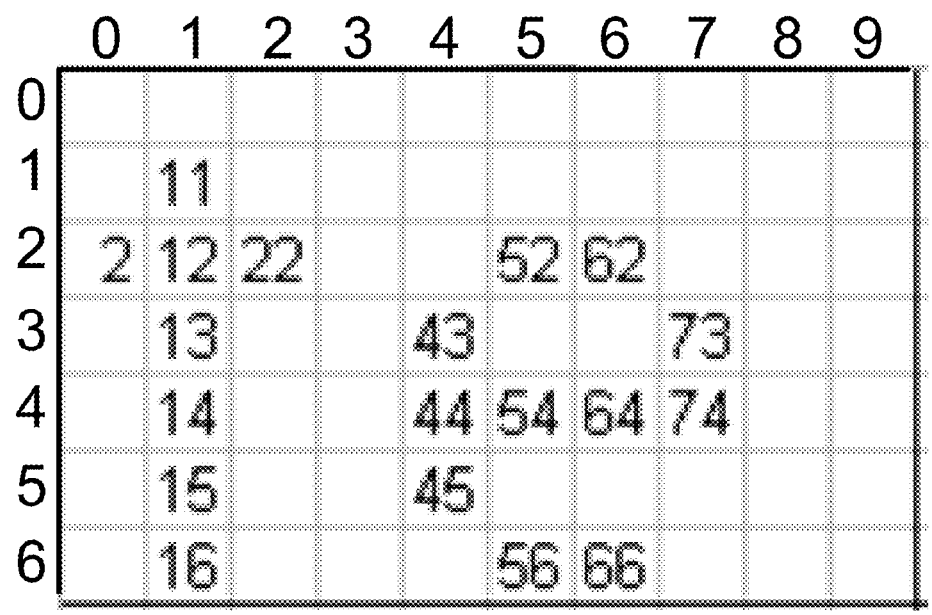
FIG. 9B depicts the image of FIG. 9A after an iteration of some of the operational procedures of FIG. 9 have been performed.

FIG. 9B depicts the image of FIG. 9A after operational procedure 906 of FIG. 9 have been performed. Each black pixel in image 9A has here been assigned a unique value. This has been accomplished by appending the pixel's x-coordinate with its y-coordinate. For instance, the upper most pixel of the "t" at (1, 1) has been assigned the value "11," and the pixel directly below it at (1, 2) has been assigned the value "12."

FIG. 9C depicts the image of FIG. 9B after an iteration of operational procedure 908 of FIG. 9 has been performed. For each pixel assigned a unique value is operated upon. Each such pixel is assigned the minimum value between the value it had in FIG. 9B and the value each adjacent pixel had in FIG. 9B. Where the minimum value the value of the pixel itself, an assignment operation need not be carried out, but the pixel's value can be left as is. It may be that a pixel does not have any adjacent pixels, because it is on the edge of the image. For instance, the pixel at (0, 2) has only five adjacent pixels because it is at the left edge of the image.

Applying this to the present image, it may be seen that the pixel at (1, 1) is assigned the value 2 because it is adjacent to the pixel at (0, 2) with the value 2, and no other adjacent pixel has a smaller value. The pixels at (1, 2) and (1, 3) are also assigned the value 2, using similar logic.

FIG. 9D depicts the image of FIG. 9C after an iteration of operational procedure 908 of FIG. 9 has been performed. Each pixel is again assigned the minimum value between the value it had after the previous iteration—here, shown in FIG. 9C—and the value each adjacent pixel had in the previous iteration. It may be noted that the value 2 is propagating among the pixels that comprise the "t" and the value 43 is propagating among the pixels that comprise the "e," as they are, respectively, the minimum value for each letter.

FIG. 9E depicts the image of FIG. 9D after an iteration of operational procedure 908 of FIG. 9 has been performed. At this point, every pixel that is a part of the "e" has been assigned the value 43, but not every pixel that is part of the "t" has been assigned the value 2.

FIG. 9F depicts the image of FIG. 9E after an iteration of operational procedure 908 of FIG. 9 has been performed. In this iteration, the "e" is unchanged, and every pixel that is part of the "t" has now been assigned the value 2. It may be noted that, because each pixel is initially assigned a unique value, at the end of these iterations, each connected segment will have a unique value. One further iteration may occur, and upon determining that no pixel is assigned a new value in the iteration (for instance, by setting a flag to FALSE before running the stage, and setting it to TRUE whenever a pixel's value is changed, then at the end of the stage, checking to see whether the flag is still FALSE), the iterations may be halted.

FIG. 10 illustrates operational procedures that may be used to perform the operations depicted by FIGS. 3A and 3B on a vector processor of a computing device. In an embodiment, the vector processor comprises logical processor 102 of FIG. 1.

The operations of FIG. 10 are similar to those of FIG. 9 in that they use parallel CPU operations to determine connected segments of an image. They both achieve this through assigning unique values to each black pixel of the image, then performing iterations of assigning each black pixel the minimum of its present value and the value of its neighbors at the end of the previous iteration. The operations of FIG. 10 differ from those of FIG. 9 in that they involve operating on columns of the image, and transposing the image so that the rows become columns that are then operated on.

It may be appreciated that the discussion of alternative embodiments in FIG. 9 applies to FIG. 10. For instance, the image need not be a black and white image, and the value assigned to a pixel need not be the minimum value.

There exist a class of processors known as vector processors that have single instruction, multiple data (SIMD) instructions in their instruction set architecture (ISA). Streaming SIMD extensions (SSE) such as the SSE 4.2 instructions in some INTEL™ x86 ISA processors, like the NEHALEM™ processor are a form of these SIMD instructions. These processors are able to speed up processing of certain types of data because they can operate on a large chunk of data at once. For instance, where an image is being processed, instead of operating on a single pixel at a time, a SIMD processor may operate on several pixels in parallel with a single instruction. Not only does this improve the performance of processing the instruction itself, but it may decrease the time spent fetching data from memory.

In discussion of FIG. 10, an example vector processor will be used that operates on 128 bits at a time, and the example size of data for each pixel will be 16 bits (so that the vector processor operates on 8 pixels at a time). It may be appreciated that these techniques may be applied on vector processors that operate on different numbers of bits at a time (for instance, 64 bits), and on a different size of data for each pixel (for instance, pixels of 16 bits).

Operation 1002 depicts a server rendering the contents of its desktop to an offscreen video surface in video memory of a GPU. This may occur similarly as in operation 902 of FIG. 9.

Operation 1004 depicts operating on the received image to produce an edge-detected image. Where this is done on the GPU, this may occur similarly as depicted in operation 904 of FIG. 9.

The desktop image is rendered to video memory in operation 1002, and the image is operated on by a vector processing CPU when it is in system memory in operation 1008, which is discussed in more detail below. Intervening operations 1004 and 1006 may occur on the GPU, the CPU or a combination of the two, and so long as the image, once copied into system memory is not copied back into video memory (and then back into system memory for the operation 1008), then only one such coping must occur (as opposed to three or more). Additionally, it may be that the time saved through processing on the GPU as opposed to the vector processor, or vice verse, overcomes this transfer cost.

Operation 1006 depicts assigning each black pixel a value. Where this is done on the GPU, this may occur similarly as depicted in operation 906 of FIG. 9 (though, note that the techniques of operation 906 involve assigning each black pixel a unique value, while the present operation, 1006, involves assigning each vertically contiguous set of pixels—or isolated pixel—a unique value).

In an embodiment where operation 1006 occurs by processing with the GPU, after operation 1006 and before operation 1008, the image is transferred from video memory to system memory so that it the pixels may be assigned values through processing with a vector processor.

Where operation 1006 occurs on a vector processing CPU, the operation begins with the upper leftmost 8-pixel wide column, and operates on that column downward until all pixels in the column have been operated upon, then moves to the next leftmost upper 8-pixel wide column, until all columns have been traversed. It may be appreciated that these techniques may be applied in a number of permutations, such as right-to-left (or middle-to-outer-edges), and bottom-to-top.

Where the width of the image is not evenly divisible by the width of the column (e.g. as against the 8-pixel wide column, a 65-pixel wide image will result in one remainder pixel), that "smaller" column may be processed with the following techniques, or disregarded. In disregarding the smaller column, connected segments present in it will not be determined and cached (though they will still be sent to the client), but where a connected segment is partially within the "smaller" column and partially outside of it, that portion outside of it may be determined and cached as according to these techniques.

As stated, the operation begins with the upper leftmost 8-pixel wide column. Each black pixel of those 8 is assigned a unique value. Then the operation moves to the 8 pixels immediately below. For each black pixel of the 8, if a black pixel is immediately above the pixel, the pixel is assigned the value of that pixel immediately above it. If a white pixel is immediately above the black pixel, then the pixel is assigned a unique value.

The unique values may be assigned, for instance by assigning each column of pixels a unique starting value. This unique starting value may be, for instance, the number of rows in the image divided by 2 and rounded up, multiplied by the number of columns to the left of the current column plus 1. That is, if there are 51 rows in the image, the $5^{th}$ column will be assigned the unique starting value of (ceiling(5½)=26)*(4+1=5)=130. Then, in the $5^{th}$ column, each black pixel in the first vertically contiguous set of pixels will be assigned 130, each black pixel in the second vertically contiguous set of pixels will be assigned 131, etc.

Note that in this situation, the set of values assigned to pixels will not be contiguous (e.g. value 129 may not be assigned in row 4).

After one column is completed, another column is begun, until the operation has been carried out for all columns of the image.

Example instructions that in a C-style syntax that may be executed by a vector processing CPU are as follows. As with the example GPU shaders of FIG. 9, it is emphasized that this is but one way of carrying out the operation, and that the operation may be carried out through hardware, or some combination of hardware and computer-executable instructions.

```
_m128i one = _mm_set_epi16( 1, 1, 1, 1, 1, 1, 1, 1);
For each batch of 8 columns:
    _m128i curId = generateColumnStartIds(cols);
    _m128i ln0 = _mm_setzero_si128( );
    _m128i ln1, aux, res;
    For each line in the columns:
        LoadLine( cols, ln1 )1
        aux = _mm_sub_epi16( one, ln1 );
        aux = _mm_and_si128( aux, ln0 );
        curId = _mm_add_epi16 ( curId, aux);
        res = _mm_mullo_epi16( ln1, curId );
        SaveLine( res );
        ln0 = ln1;
    End For
End For
```

When this assignment is completed, the image may be transposed. For instance, the image may be transposed through an operation that takes the mirror image of the image, then rotates the mirror image 90 degrees to the left, such that what was the top row is now the leftmost column.

This transposition operation may be a discrete operation or may occur as the pixels are assigned values. For instance, a system memory space that represents the transposed image may be created. As each pixel is compared to the one above it, the value that this pixel is to have (whether its prior value or a new value) may be written to its transposed location in this other system memory space. When these assignment operations have been completed for each pixel, the new system memory space will contain the image transposed.

Operation 1008 depicts determining connected segments of the image based on the values of the pixels determined in operation 1006.

As in operation 908, in operation 1008, multiple iterations of an algorithm are used to assign a pixel a value. Here, columns of pixels are processed as in operation 1006 (though, operation need not start at the same part of the image that operation 1006 did; for instance, operation 1006 could start in the upper left column and move down through the column and then to the right, while operation 1006 could start in the bottom left column and move up through the column and then to the right). Each black pixel is assigned the minimum value of itself and the pixel directly above it. For pixels in the top row of the image that have no pixels above them, these pixels are not assigned values.

Where there is a remainder number of pixels, as described in operation 1006, it may be that the operations of 1008 are not carried out on these pixels.

When this assignment is completed, the image may be transposed, similar as to discussed with respect to operation 1006.

Successive iterations of operation 1008 may take place until no pixel is assigned a value in an iteration (meaning that each connected segment is recognized as every pixel that shares the same value), or for some lesser number of iterations (similar to as discussed with respect to operation 908).

Where the iterations conclude, and the image is not in its original orientation, the image may be transposed to its original orientation—such that the pixel that began in the upper left corner of the image is once again located in the upper left corner of the image.

This iterations of assigning values to pixels may be implemented through the following C-style syntax executed on a vector processing CPU:

```
_m128i one = _mm_set_epi16( 1, 1, 1, 1, 1, 1, 1, 1);
_m128i maxInt = _mm_set_epi32( 0xFFFFFFFF, 0xFFFFFFFF, 0xFFFFFFFF, 0xFFFFFFFF);
_m128i maxIntM1 = _mm_set_epi16( -2, -2, -2, -2, -2, -2, -2, -2 );
For each batch of 8 columns:
   _m128i minLn, aux, aux2;
   _m128i ln0 = _mm_setzero_si128( );
   _m128i res;
   For each line in the column:
      LoadLine( cols, ln1 );
      aux = _mm_ adds_epi16( maxIntM1, ln0 );
      aux = _mm_sub_epi16( maxInt, aux );
      aux2 = _mm_sub_epi16( one, aux );
      minLn = _mm_min_epi16( ln0, ln1 );
      res = _mm_mullo_epi16( ln1, aux );
      aux2 = _mm_mullo_epi16( minLn, aux2 );
      res = _mm_add_epi16( res, aux2 );
      SaveLine( res );
      Ln0 = ln1;
   End For
End For
```

Put another way, that can be expressed as IdNew=IdCurrent*aux+min(IdCurrent, IdNeigh)*(1−aux). Here, IdCurrent is the value at the current pixel location, as established by the previous iteration, or initial value assignment. IdNeigh is the value at the pixel immediately above the current pixel. aux{0, 1} is an auxiliary value computed as aux=0xFF-saturated (0xFE+IdNeigh).

Operation 1010 depicts determining a bounding box for each connected segment. This may be performed similar as discussed with respect to operation 910 of FIG. 9.

Operation 1012 depicts caching these identified connected segments as features, encoding a stream to represent occurrences of cache hits of these features to replace the bitmap contents in the image. This may occur as depicted in operation 914 of FIG. 9.

Operation 1014 depicts sending the encoded stream to a client in a remote presentation session, as depicted in FIG. 7. This may occur as depicted in operation 916 of FIG. 9.

FIG. 10A depicts a binary image upon which the operations of FIG. 10 may be executed. Those pixels assigned the binary value 1 may be considered black or "on"—pixels for which the comparative assignment operations of FIG. 10 will be made. Those pixels assigned the binary value 0 may be considered white or "off"—pixels for which no comparative assignment operations of FIG. 10 will be made.

There are three columns and 12 rows in the image. While FIG. 10 uses an example of a column 8 pixels wide, this smaller three-pixel wide column may be helpful for illustrative purposes, and the techniques may be applied to each.

FIG. 10B depicts the binary image of FIG. 10A after each black pixel has been assigned a value in operation 1006 of FIG. 10. The first column begins with unique starting value 1 and assigns it to the first black pixel it encounters. It assigns this value again to the black pixel in the second row, because it is adjacent to the black pixel above it, and to the black pixel in the third row for the same reasons.

There are no black pixels in rows 4 or 5, so they are not assigned values. Upon encountering the white pixel in row 4, the unique starting identifier for this column may be incremented from 1 to 2, such that the next encountered black pixel will be assigned 2.

That next encountered black pixel is found in row 6, where it is assigned 2, as are the three pixels below it. A white pixel is found in row 10, so it is not assigned a value and the unique starting identifier is incremented again, from 2 to 3. Then the black pixels in rows 11 and 12 are assigned 3.

Similar operations occur for the pixels in columns 2 and 3 (and because the operations occur in parallel, all three pixels of the first row are processed before any pixel in the second row is processed). Column 2 begins with a unique starting identifier that cannot be assigned to a pixel in any other column—here represented by "A" (and incremented to "B," "C," and "D"). Column 3 likewise begins with a unique starting identifier—here represented by "X" (and incremented to "Y," "Z" and "W").

FIG. 10C depicts the image of FIG. 10B after it has been transposed in operation 1006 of FIG. 10. Those 12 pixels that made up the leftmost column of the image now make up the top row of the image, with the pixel in the upper left corner keeping its position (and the pixel in the lower right corner keeping its position).

FIG. 10D depicts the image of FIG. 10C after each pixel has been assigned a value in operation 1008 of FIG. 10. Each pixel is assigned the minimum of itself and the pixel directly above it (disregarding the zeroes as they represent white pixels, and therefore would not be part of connected segments of black pixels). In the present embodiment, the upper left 8 pixels and the 8 pixels immediately below those pixels in the second row are first assigned values (the top row is not assigned a value, since it has no row above it with which to compare the pixel's value, but it is used to compare against the second row). Then, the 8 pixels in the third row (those immediately below those in the previously discussed second row) are assigned values. The three rows in that first column of 8 pixels being assigned values, similar operations are performed on the rightmost column of 4 pixels in a similar fashion.

Not depicted in FIGS. 10A-D are further transposing and pixel assignment operations that can be computed until an iteration where no pixel is assigned a value, or for some period less (such as a set number of iterations, or until a period of time has elapsed).

CONCLUSION

While the present disclosure has been described in connection with the preferred aspects, as illustrated in the various figures, it is understood that other similar aspects may be used or modifications and additions may be made to the described aspects for performing the same function of the present disclosure without deviating therefrom. Therefore, the present disclosure should not be limited to any single aspect, but rather construed in breadth and scope in accordance with the appended claims. For example, the various procedures described herein may be implemented with hardware or software, or a combination of both. Thus, the methods and apparatus of the disclosed embodiments, or certain aspects or portions thereof, may take the form of program code (i.e., instructions) embodied in tangible media, such as floppy diskettes, CD-ROMs, hard drives, or any other machine-readable storage medium. When the program code is loaded into and executed by a machine, such as a computer, the machine becomes an apparatus configured for practicing the disclosed embodiments. In addition to the specific implementations explicitly set forth herein, other aspects and implementations will be apparent to those skilled in the art from consideration of the specification disclosed herein. It is intended that the specification and illustrated implementations be considered as examples only.

What is claimed:

1. A method, comprising:
   determining a set of pixels for an image;
   assigning each pixel of the set of pixels a value;
   determining a connected segment of the image, the connected segment comprising each pixel of the image that shares a value,
      determining the connected segment comprising determining the connected segment stored in a video memory of a graphics processing unit (GPU) by operating on each pixel of the image in parallel through the use of pixel shaders with the GPU,
      determining the connected segment comprising
         determining an extreme value, the extreme value comprising a maximum value or a minimum value; and
         performing an iteration on the image, the iteration comprising:
            assigning each pixel of the set of pixels a value comprising the extreme value or the value of an adjoining pixel; and
   storing the connected segment in a memory.

2. The method of claim 1, wherein each pixel has an x-coordinate and a y-coordinate, further comprising:
   determining a bounding box of the connected segment, the bounding box comprising the greatest x-coordinate of a pixel of the connected segment, the least x-coordinate of a pixel of the connected segment, the greatest y-coordinate of a pixel of the connected segment, and the least y-coordinate of a pixel of the connected segment; and
   storing an indication of the bounding box in a memory.

3. The method of claim 1, wherein the value assigned to each pixel is unique.

4. The method of claim 3, wherein each pixel has an x-coordinate and a y-coordinate, and the value assigned to the pixel comprises the x-coordinate of the pixel and the y-coordinate of the pixel.

5. The method of claim 1, wherein storing the connected segment in the memory comprises:
   storing the connected segment in a system memory of a computing device.

6. The method of claim 1, further comprising:
   performing iterations on the image until determining that an iteration has been performed without assigning any pixel a new value.

7. The method of claim 1, further comprising:
   performing iterations on the image until a specified number of iterations has been performed or until a time has been reached.

8. A system, comprising:
   a memory bearing instructions that, upon execution by a processor, cause the system at least to:
      determine a set of pixels for an image;
      assign each pixel of the set of pixels a value;
      determine a connected segment of the image, the connected segment comprising each pixel of the image that shares a value,
         determine the connected segment comprising determining the connected segment stored in a video memory of a graphics processing unit (GPU) by operating on each pixel of the image in parallel through the use of pixel shaders with the GPU,
         determine the connected segment comprising
            determine an extreme value, the extreme value comprising a maximum value or a minimum value; and
            perform an iteration on the image, the iteration comprising:
               assigning each pixel of the set of pixels a value comprising the extreme value or the value of an adjoining pixel; and
      store the connected segment in a second memory.

9. The system of claim 8, wherein the instructions that, upon execution by the processor, cause the system to determine the connected segment further cause the system at least to:
   determine the connected segment stored in a system memory by operating on pixels of the image in parallel through the use of a single instruction multiple data (SIMD) instruction of a vector processor.

10. The system of claim 8, wherein the image comprises a column of pixels, and wherein the instructions that, upon execution by the processor, cause the system to assign each pixel of the set of pixels a value further cause the system at least to:
    assign a first pixel of the set of pixels a value of a pixel adjacent to it in the column in which the first pixel is located when the first pixel is adjacent to a pixel of the set of pixels in the column that has been assigned a value.

11. The system of claim 8, wherein each column of the image has a unique starting value, and assigning a first pixel a value is based on the unique start value of the column of the first pixel.

12. The system of claim 8, wherein the instructions that, upon execution by the processor, cause the system to perform an iteration on the image further cause the system at least to:
    transpose the image.

13. The system of claim 12, wherein the instructions that, upon execution by the processor, cause the system to transpose the image further cause the system at least to:
    store the value of each pixel in a first memory location, the first memory location differing from a memory location of the image.

14. The system of claim 8, wherein the memory further bears instructions that, upon execution by the processor, cause the system at least to:
    determine the set of pixels by determining an edge of the connected segment of the image.

15. The system of claim 14, wherein the instructions that, upon execution by the processor, cause the system to determine the edge of the connected segment further cause the system at least to:

converting the image into a binary representation of the image, converting the image into a black and white representation of the image, and transforming the image by performing an edge-detection operation on the image.

16. A computer-readable storage device, bearing computer-readable instructions that, when executed on a computing device, cause the computing device to perform operations comprising:

determining a set of pixels for an image;

assigning each pixel of the set of pixels a value;

determining a connected segment of the image, the connected segment comprising each pixel of the image that shares a value, determining the connected segment comprising determining the connected segment stored in a video memory of a graphics processing unit (GPU) by operating on each pixel of the image in parallel through the use of pixel shaders with the GPU, determining the connected segment comprising determining an extreme value, the extreme value comprising a maximum value or a minimum value; and performing an iteration on the image, the iteration comprising:

assigning each pixel of the set of pixels a value comprising the extreme value or the value of an adjoining pixel; and storing the connected segment in a memory.

17. The computer-readable storage device of claim 16, further bearing computer-readable instructions that, when executed on the computing device, cause the computing device to perform operations comprising:

storing the connected segment in a cache when the connected segment is not already stored in the cache;

determining a tiling scheme for the image;

replacing a portion of each tile of the tiling scheme corresponding to the connected segment with an image;

producing at least one tile based on the tiling scheme;

storing each tile in the cache that is not already stored in the cache;

determining, based on the cache, whether a second computing device has each tile, and the connected segment;

sending each tile and the connected segment that the second computing device does not have across a communications network to the second computing device for display; and sending an indication of each tile and the connected segment that the second computing device does have across the communications network to the second computing device for display.

* * * * *